United States Patent [19]
Dennstedt

[11] 3,781,657
[45] Dec. 25, 1973

[54] METHOD AND APPARATUS FOR DETERMINING AND INDICATING THE STATE OF CHARGE OF NICKEL CADMIUM BATTERIES

[75] Inventor: Welf Dennstedt, Kelkheim, Germany

[73] Assignee: Varta Aktiengesellschaft, Kelkheim, Germany

[22] Filed: Dec. 30, 1971

[21] Appl. No.: 214,030

[30] Foreign Application Priority Data
Jan. 2, 1971    Germany................. P 21 00 011.3

[52] U.S. Cl.............. 324/29.5, 136/182, 320/48, 340/249
[51] Int. Cl. .......................................... G01n 27/42
[58] Field of Search................. 324/29.5; 340/249; 320/48; 136/182

[56]    References Cited
UNITED STATES PATENTS
2,864,055   12/1958   Kordesch et al................. 324/29.5
3,657,639    4/1972   Willihnganz..................... 324/29.5

FOREIGN PATENTS OR APPLICATIONS
254,852      7/1926   Great Britain................... 324/29.5
1,333,521    6/1963   France........................... 324/29.5

Primary Examiner—Stanley T. Krawczewicz
Attorney—Arthur E. Wilfond et al.

[57]    ABSTRACT

The invention proposes a method and apparatus for determining and indicating the state of charge of nickel-cadmium batteries. The method is based upon the degree of shift of the operating potential of the positive electrode in the negative direction when the electrode is under load. The shift in this potential is a measure of the extent of the discharge which has taken place and is thereby an indication of the state of charge.

7 Claims, 2 Drawing Figures

METHOD AND APPARATUS FOR DETERMINING AND INDICATING THE STATE OF CHARGE OF NICKEL CADMIUM BATTERIES

The invention relates to a method and an apparatus for ascertaining and indicating the state of charge of nickel-cadmium batteries.

It is important for a user to know the state of charge of a battery, since the charging of the battery in time will only be possible as a result of an exact knowledge of such state of charge. Failures may occur when the state of discharge has been recognized too late. In order to make sure that such failures are avoided, generally, a special effort must be expended for the charge, which may be partially excessive.

The literature has disclosed various methods for recognizing the state of charge of alkaline batteries. Thus, for instance, the cell potential or the specific gravity of the electrolyte has been used as a function of the state of charge for the purpose of determining such a charge condition. The amperage which has been taken out of the battery had also been registered on a current quantity meter, and the state of charge of the battery has thereby been determined. The method of so-called "current sharing" has also been used as an indirect method for determining the state of charge. All of these methods, however, are suitable for indicating the state of charge only approximately, since the indicated measurable properties of the battery do not change sufficiently and unambiguously during charge and discharge, or, because complicated electronic apparatus is required.

It is an object of the invention to determine the state of charge or discharge of a nickel-cadmium battery in a simple and clear manner and to provide a precise indication. This object is attained in that the potential of the positive electrode under load is measured with the aid of a reference electrode and that the state of charge is determined as a measure of the potential shift in the negative direction.

The method is based on the shift in the operating potential of the positive electrode in the negative direction with the electrode under load. The potential shift increases with the increase of the load and with progressive discharge of the electrode. As proposed by the invention, this shift serves as a measure of the degree of discharge which has taken place, including self discharge, thus serving as a measure for the state of charge.

This shift is measured with an $Ag_2O/Ag$ electrode (reference electrode). A special arrangement provides a signal as the shift exceeds a limit value, and which thereby indicates a predetermined charge-discharge condition.

The invention is particularly base on the fact that the internal resistance of the electrode, that is, the conductivity of the active mass, is evidently different in the charged and discharged state. It was found by experiment that uncharged nickel-hydroxide has a specific resistance of $10^3$ to $10^6$ $\Omega$ cm, while charged nickel-hydroxide has a corresponding value of $10^2$ $\Omega$ cm. A potential drop occurs at the internal resistance with a definite current load (apart from polarization), which results in a shift of the open-circuit potential of the nickel-hydroxide electrode in the negative direction. The internal resistance increases with increased discharge of the electrode; the electrode potential shifts in the negative direction corresponding to a predetermined load. The amplitude of the operating potential of the nickel-hydroxide electrode, in contrast to most of the other measured variables of the nickel-cadmium batteries, is influenced especially clearly by the state of charge. Thus the potential of the positive electrode, which usually is also the electrode which limits the capacity, is dependent on the amplitude of the discharge current and on the state of charge of the electrode (for instance, in pocket', mass' and sinter-electrodes).

With these and other objects in view, which will become apparent in the following detailed description, the present invention will be clearly understood in connection with the accompanying drawings, in which.

Due to this property of the electrode, the possibility exists, therefore, to obtain any desired potential at the positive electrode within certain limits. For this purpose, a predetermined output discharge current and the provision of a suitable charge condition of the electrode are necessary. For a given discharge current, the resultant potential becomes a function of the state of charge. Accordingly, therefore, a basically reconizable characteristic is available for determining the state of charge.

Example

The equilibrium rest potential of the charged nickel-hydroxide electrode is found at 1320 mV measured against hydrogen in the same medium. The potential of the electrode will be found to be about 1100 mV when measured under load during discharge with $I_5$ up to a discharge of e.g. 70 percent of capacity. Wherein $I_5$ means the intensity of the discharging current, which is necessary for discharging the electrodes completely in a time of five hours.

Another feature of the invention is provided in that a signal is given, whenever the potential exceeds a threshold value. The signal may be generated either during operation of the battery during discharge or when a test current is applied. The signal makes it possible for an observer to recognize the attained charge or discharge condition, whereupon the necessary arrangements for the charge-up may be made.

This arrangement comprises a reference electrode built into the battery, having a capacity which is not too small and which may be used with the usual electrolytes of the nickel-cadmium batteries, the equilibrium potential of which being somewhat lower, that is more negative, than that of the nickel-hydroxide electrode. As an example, the $Ag_2O/Ag$ electrode or possibly also the $Hg/HgO$ electrode is suitable for this purpose. The $Ag_2O/AgO$ electrode potential is at 1170 mV taken against the hydrogen electrode, which is 150 mV lower than that of the nickel-hydroxide electrode, and lies therefore in an especially favorable range. Accordingly, the invention is described with reference to the $Ag_2O/Ag$ electrode as an example.

Figure 1:
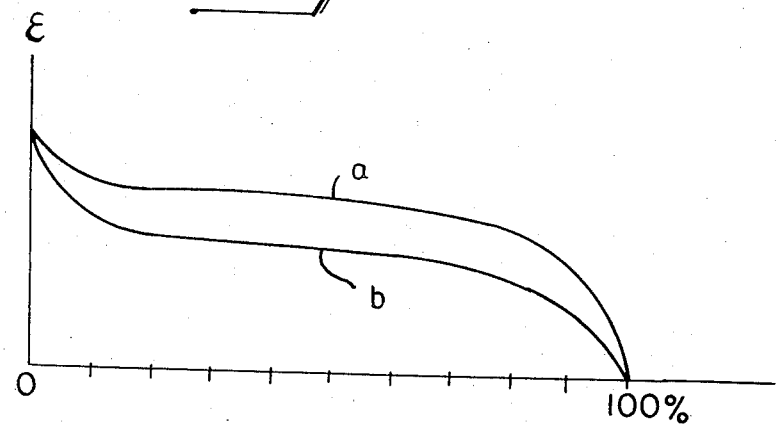
FIG. 1 illustrates, in a graphical form, the dependence of the potential on the amperage taken out. The upper graph, a, shows the pattern of the potential with lower, and the lower graph, b, shows the pattern or variation of the potential with higher loading.
Figure 2:
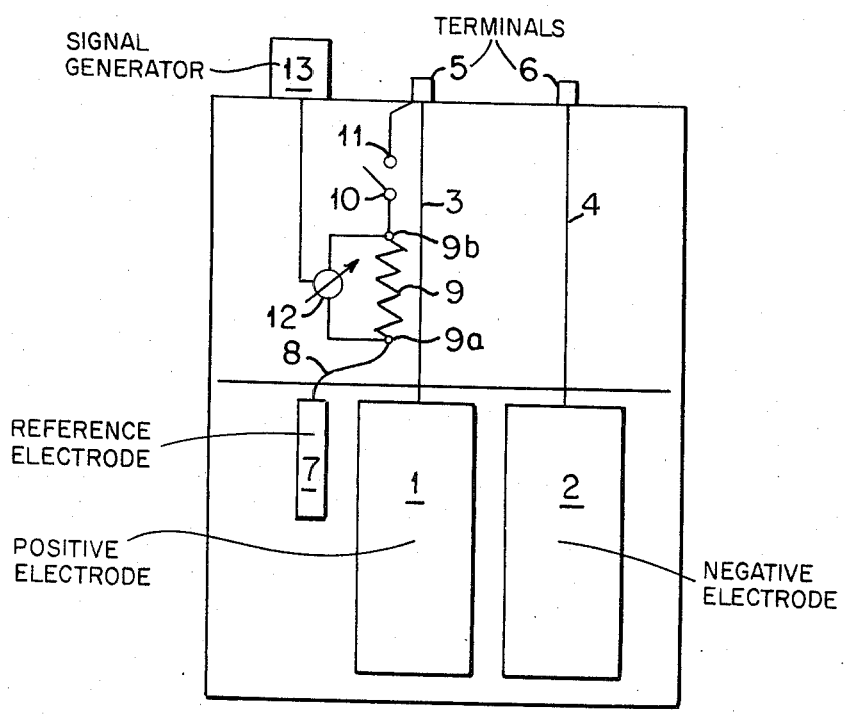
FIG. 2 is a schematic representation of a battery and a charge determining circuit as proposed by the invention.

The reference electrode, as assembled into the battery and its operation will be described with reference to FIG. 2. As is usual, the battery contains a number of positive nickel-hydroxide electrodes 1 and negative cadmium or iron electrodes 2, which are connected to terminals 5 and 6 through conductors 3 and 4. A reference electrode 7 is disposed in the vicinity of the positive electrodes. The electrode 7 through conductor 8 is connected to a resistance 9, and through an additional connection 10 over a switch 11 to the terminal of the positive electrode 5. The resistance is connected at one of its terminals 9a to the reference electrode and at its other terminal 9b with the automatic switch 11. A voltage meter is connected to a signal generator 13 across the terminals 9a and 9b. As a fully charged battery is operated and discharged, in accordance with the above, switch 11 being closed, the potential of the positive electrode, at first, is more positive than that of the reference electrode. At this point of discharge, the potential measured across the resistance at 9a equals the potential at 9b, or it may be somewhat more negative than 9b.

Ordinarily, the potentials at 9a and 9b will be equal, since the potential at the reference electrode is determined by the monovalent silver, and a further charge-up to the bivalent silver due to the equilibrium rest potential of the nickel hydroxide electrode will not occur. Sometimes, the potential 9a is somewhat more negative than at 9b, because a very small current will flow so as to maintain the charge of the reference electrode. The potential drop which thereby occurs between 9a and 9b will be so small as to be immeasurable.

After a certain time of a precisely predetermined discharge of the positive electrode under load (as defined by a given discharge current or through the application of a test current), the potential of this electrode will fall below the potential of the reference electrode. That is to say, the potential of the positive electrode becomes more negative than the potential of the reference electrode. From this point in time on, in addition to the nickel (III, IV)-hydroxide stage of the positive electrode, the stage of the monovalent silver at the reference electrode will also be discharged. A current will flow from 7 through 9 and 11 toward 5, causing a potential drop at the terminals 9a and 9b of the resistor 9, whereby the potential at 9a becomes more positive than that at 9b. In practice, the potential difference which is indicated at this point, will lie between about 10 and 100 mV, preferably at 50 mV, which of course makes it easily measurable. This potential difference may be indicated by means of a voltmeter 12, which may be applied across 9a and 9b. The meter 12 may be connected temporarily for the purpose of test, or may be present continuously as part of the battery equipment. As a result, a signal generator 13 may be actuated, which makes the need for recharging known. The energy which is used by this signal generator may be taken from the battery under test.

The battery is thus in a position to make known automatically and timely when a precisely predetermined partial discharge of its capacity has taken place.

In order to preserve the functional capability of the reference electrode, the electrode will be disconnected by means of the automatically acting switch 11 prior to each charge of the battery.

The cut-off is necessary because the positive electrode of the battery, during charge, preferably toward the end of the charge, i.e. during gas discharge, is being charged at a higher potential which exceeds the potential of the change-over from $Ag_2O$ to $AgO$. During this charge, the silver (I) oxide in the reference electrode is at least partially oxidized into silver (II) oxide. The potential of the reference electrode thus would become more positive than it is desirable in accordance with the present proposal. The reference electrode, therefore, will be connected again only after the conclusion of the charge of the battery by means of the switch 11.

The reference electrode, as a matter of course, will be subject to self discharge. During the time of the signal indication, a discharge of the reference electrode also takes place. The required charge-up of the reference electrode to the potential of the silver (I) oxide is effected after closing of the switch 11 through the nickel hydroxide electrode, the equilibrium potential of which exceeds the equilibrium potential of the $Ag_2O/Ag$ electrode by 150 mV.

While I have disclosed a specific embodiment of the present invention, it is to be understood that this embodiment is given by example only and not in a limiting sense, the scope of the present invention being determined by the objects and the claims.

It is claimed:

1. Method of measuring and indicating the state of charge of Nickel Cadmium batteries, having a positive nickel-hydroxide electrode and a negative cadmium electrode comprising the steps of providing a fully charged Nickel Cadmium battery, providing a reference electrode for the battery, providing a load for the battery, obtaining the potential of the positive electrode with respect to the reference electrode, and deriving the state of charge from the potential shift of the positive electrode in the negative sense.

2. The method according to claim 1, further including the step of generating a signal in response to a value of the positive electrode potential in excess of a threshold value.

3. Apparatus for determining and indicating the state of charge of Nickel Cadmium batteries, comprising a Nickel Cadmium battery, a positive electrode for said battery, a reference electrode for said positive electrode disposed within said battery, and means for measuring the potential difference between said positive and said reference electrodes connected therebetween.

4. Apparatus according to claim 3, wherein said reference electrode comprises an $Ag_2O/Ag$ electrode.

5. Apparatus according to claim 3, wherein said measuring means comprises a resistance connected between said positive and reference electrodes, and a voltage meter connected across said resistor.

6. Apparatus according to claim 5, further including a make and break switch in circuit with said resistor responsive to charging current for said battery.

7. Apparatus according to claim 3, further including means for generating a signal in response to a given value of potential difference between said positive and reference electrodes connected to said measuring means.

* * * * *